(12) United States Patent
Ou et al.

(10) Patent No.: US 11,910,482 B2
(45) Date of Patent: Feb. 20, 2024

(54) METHOD AND APPARATUS FOR UE REPORTING FOR MULTI-USIM IN A WIRELESS COMMUNICATION SYSTEM

(71) Applicant: ASUSTek Computer Inc., Taipei (TW)

(72) Inventors: Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/835,555

(22) Filed: Mar. 31, 2020

(65) Prior Publication Data

US 2020/0336887 A1    Oct. 22, 2020

Related U.S. Application Data

(60) Provisional application No. 62/834,827, filed on Apr. 16, 2019.

(51) Int. Cl.
*H04W 8/22* (2009.01)
*H04W 88/06* (2009.01)

(52) U.S. Cl.
CPC ............ *H04W 8/22* (2013.01); *H04W 88/06* (2013.01)

(58) Field of Classification Search
CPC ......... H04W 8/22; H04W 88/06; H04W 8/18; H04W 8/20
See application file for complete search history.

(56) References Cited

U.S. PATENT DOCUMENTS

| | | | | |
|---|---|---|---|---|
| 7,760,711 B1 * | 7/2010 | Kung | .................... | H04L 12/145 370/352 |
| 10,623,946 B1 * | 4/2020 | Kumar | ................. | H04W 76/27 |
| 2011/0028135 A1 * | 2/2011 | Srinivasan | ........ | H04M 3/42382 455/415 |
| 2013/0150032 A1 * | 6/2013 | Pattaswamy | ...... | H04W 52/0229 455/434 |
| 2013/0237197 A1 * | 9/2013 | Ruvalcaba | ............ | H04W 8/183 455/418 |
| 2014/0120925 A1 | 5/2014 | Kanthala et al. | | |
| 2014/0274051 A1 * | 9/2014 | Hsu | ....................... | H04W 88/06 455/436 |
| 2015/0065132 A1 * | 3/2015 | Ramkumar | ........... | H04W 48/16 455/435.2 |
| 2015/0230070 A1 * | 8/2015 | Kadiyala | ............... | H04W 72/02 455/552.1 |

(Continued)

FOREIGN PATENT DOCUMENTS

| | | |
|---|---|---|
| CN | 104272810 A | 1/2015 |
| CN | 104380807 A | 2/2015 |
| CN | 106464611 A | 2/2017 |
| CN | 106465464 A | 2/2017 |
| CN | 107113672 A | 8/2017 |

OTHER PUBLICATIONS

China Telecom, vivo, "Motivation for SI on multi-SIM devices in RAN", 3GPP TSG RAN Meeting #83 RP-190248 Shenzhen, China, Mar. 18-21, 2019.

(Continued)

*Primary Examiner* — Dinh Nguyen

(74) *Attorney, Agent, or Firm* — Cooper Legal Group LLC

(57) ABSTRACT

A method and apparatus are disclosed. In an example from the perspective of a User Equipment (UE), the UE provides information related to multiple Universal Subscriber Identity Modules (USIM) of the UE to a first network.

16 Claims, 9 Drawing Sheets

(56) References Cited

U.S. PATENT DOCUMENTS

| | | | | |
|---|---|---|---|---|
| 2016/0094662 | A1* | 3/2016 | Kollu | H04L 43/0882 709/224 |
| 2016/0345244 | A1* | 11/2016 | Chuttani | H04W 4/021 |
| 2017/0094591 | A1* | 3/2017 | Namboodiri | H04B 17/318 |
| 2018/0160422 | A1* | 6/2018 | Pathak | H04W 76/20 |
| 2018/0368099 | A1* | 12/2018 | Chen | H04W 48/18 |
| 2019/0110236 | A1 | 4/2019 | Huang et al. | |
| 2021/0282103 | A1* | 9/2021 | Zhu | H04W 76/15 |

OTHER PUBLICATIONS

Vivo, China Telecom, "New Rel-17 SID proposal: Study on multi-SIM devices in RAN", 3GPP TSG RAN Meeting #83 RP-190282 Shenzhen, China, Mar. 18-21, 2019.

SA WG2, "New SID: Study on system enablers for multi-SIM devices", TSG SA Meeting #SP-82 SP-181115, Dec. 12-14, 2018, Sorrento, Italy (S2-1813349).

SA1, "Proposed WID on Support for Multi-USIM Devices (MUSIM)", 3GPP TSG-SA Meeting #84 SP-190309, Newport Beach, CA, USA, Jun. 5-7, 2019.

Corresponding Korean Patent Application No. 10-2020-0038697, Office Action dated Apr. 22, 2021. English Translation.

Ericsson, R2-115375, Dual-SIM Dual-Standby UEs and their impact on the RAN, 3GPP TSG RAN WG2 #75bis, 3GPP Server released date (Oct. 3, 2011).

SA WG2, SP-181251, New SID: Study on system enablers for multi-SIM devices, 3GPP TSG SA #82, 3GPP Server released date (Dec. 14, 2018).

Motorola Mobility et al., S2-185364, UE radio capability handling in the 5GS, 3GPP TSG SA WG2 #127bis, 3GPP Server released date (May 22, 2018).

Corresponding Chinese Patent Application No. 202010241607.4, Office Action dated Oct. 7, 2023, 16 pages.

\* cited by examiner

METHOD AND APPARATUS FOR UE REPORTING FOR MULTI-USIM IN A WIRELESS COMMUNICATION SYSTEM

CROSS-REFERENCE TO RELATED APPLICATIONS

The present application claims the benefit of U.S. Provisional Patent Application Ser. No. 62/834,827 filed on Apr. 16, 2019, the entire disclosure of which is incorporated herein in its entirety by reference.

FIELD

This disclosure generally relates to wireless communication networks, and more particularly, to a method and apparatus for User Equipment (UE) reporting for multi-Universal Subscriber Identity Module (USIM) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE provides information related to multiple Universal Subscriber Identity Modules (USIM) of the UE to a first network.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP SP-190248, Revised SID: Study on system enablers for multi-SIM devices; 3GPP SP-190241, new SID: Study on Support for Multi-USIM Devices; 3GPP TS 21.905 V15.1.0, Vocabulary for 3GPP Specifications (Release 15); 3GPP TS 21.211 V15.1.1, USIM and IC card requirement (Release 15); 3GPP TS 24.002 V15.0.0, GSM-UMTS PLMN access reference configuration (Release 15); 3GPP TS 38.331 V15.4.0, NR RRC protocol specification (Release 15). The standards and documents listed above are hereby expressly incorporated by reference in their entirety.

Figure 1:
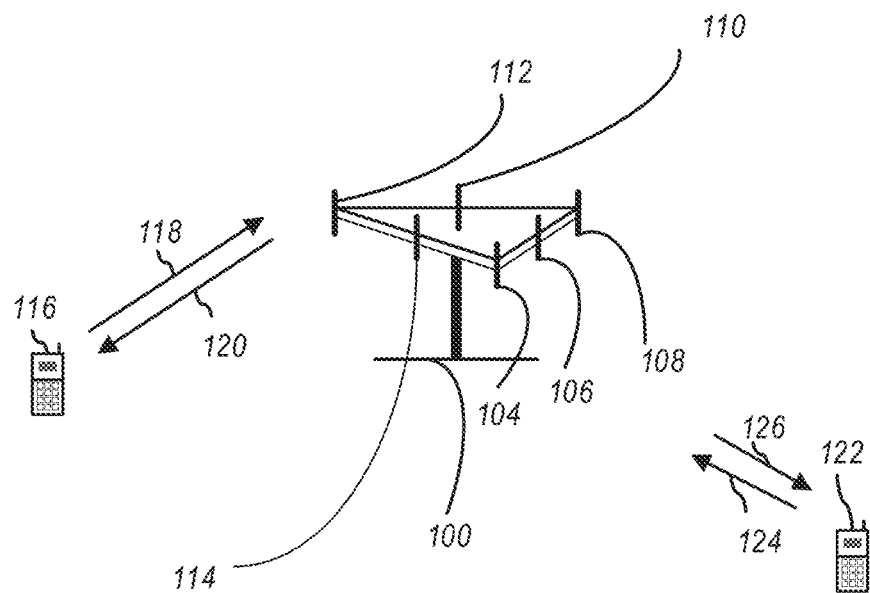
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB) or some other terminology. An access terminal (AT) may also be called user equipment (UE), a wireless communication device, terminal, access terminal or some other terminology.

Figure 2:
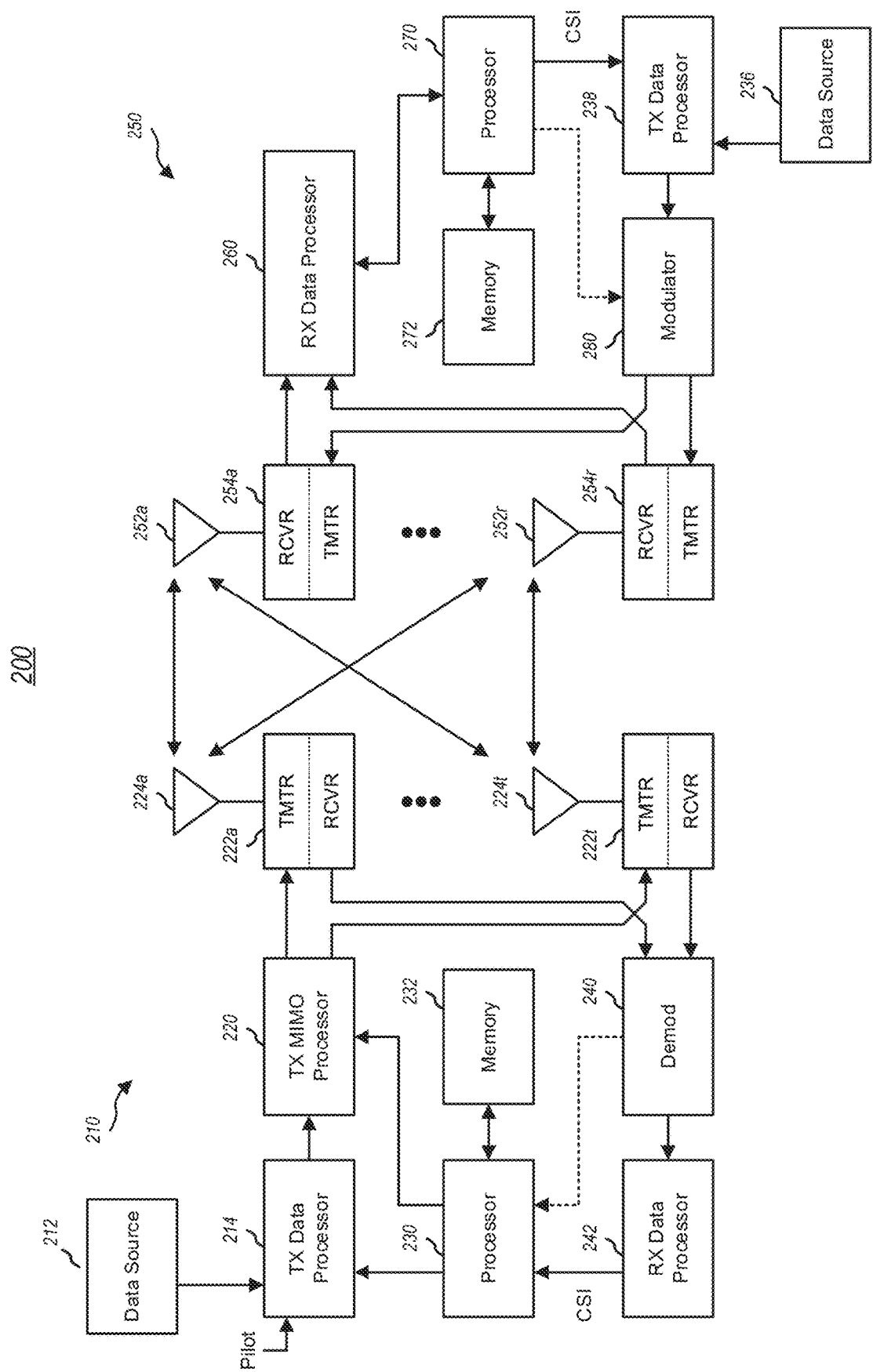
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
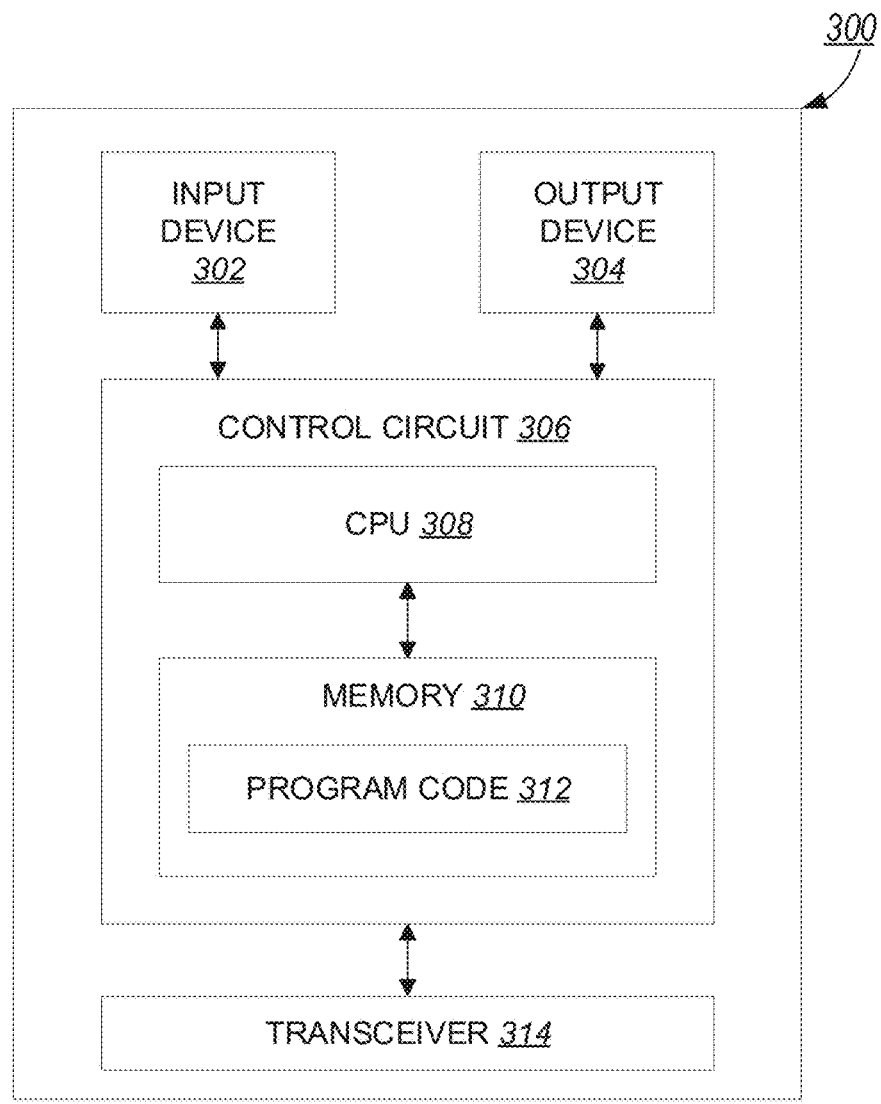
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
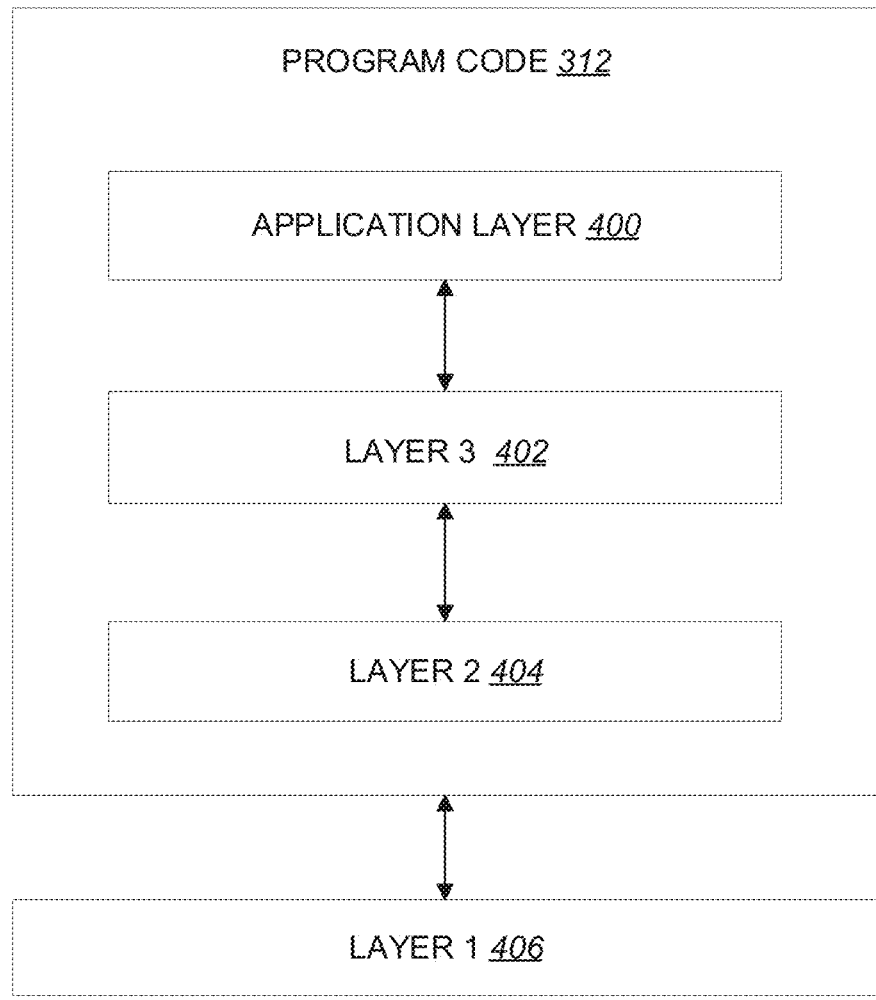
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Devices supporting multiple USIM cards are becoming more popular and/or prevalent. Study on system enablers for multi-USIM devices may be done in 3GPP SA1 and SA2 groups. Related justification and objectives of the study can be found in 3GPP SP-190248 and 3GPP SP-190241.

Parts of 3GPP SP-190248 are quoted below:

Support for multi-USIM is currently handled in an implementation-specific manner without any support from 3GPP specifications, resulting in a variety of implementations and UE behaviours (e.g. Dual SIM Single Standby, Dual SIM Dual Standby, Dual SIM Dual Active, etc.).

For cost efficiency reasons, a multi-USIM device implementation typically uses common radio and baseband components that are shared among the multiple USIMs, which can lead to several issues that impact the 3GPP system performance Consider a multi-USIM device that is actively engaged in communication with a 3GPP system:

While actively communicating with the first system, the UE needs to occasionally check the other system (e.g. to read the paging channel, perform measurements, or read the system information). This occasional activity on the second system may or may not have any performance impact, depending on the UE implementation.

NOTE 1: The specific aspects of how the UE manages to read information in the second system while actively communicating with the first system are not to be considered in SA2, but could be considered in RAN working groups.

Paging Occasions (POs) are calculated based on the UE identifier (IMSI and 5G-S-TMSI for EPS and 5GS, respectively). In some cases the UE identifier values associated with the different USIMs can lead to systematic collisions which may result in missed pages.

When the UE receives a page on the second system, the UE needs to be able to decide whether it should respond to the page (e.g. by following user-configured rules). In the absence of information indicating the service type that triggered the paging, the UE would have to blindly decide whether to ignore the page or respond to it.

NOTE 2: It is noted that UTRA-Uu supports a Paging Cause which indicates the traffic type that triggered the page.

When the UE decides to respond to the page in the second system, or when the UE needs to perform some signalling activity in the second system (e.g. Periodic Mobility Registration Update), the UE may need to stop the current activity in the first system. In the absence of any procedure for suspension of the ongoing activity, the UE has to autonomously release the RRC connection with the first system and abruptly leave. This is likely to be interpreted as an error case by the first system and has the potential to distort the statistics in the first system, and misguide the algorithms that rely on them. Moreover, during the UE's absence, the first system will keep paging the UE which will result in waste of paging resources.

...

This study item shall address the following system enablers for multi-USIM devices:

A mechanism for delivering paging destined to USIM A while the UE is actively communicating with USIM B.

A mechanism allowing for suspension (or release) and resumption of an ongoing connection in the 3GPP system associated with USIM A, so that the UE can temporarily leave to the 3GPP system associated with USIM B, and then return to the 3GPP system in a network-controlled manner. The study shall determine how the network handles MT data or MT control-plane activity occurrence on a suspended connection.

A mechanism for avoidance of paging collisions occurring in the UE between USIM A and USIM B.

Handling of emergency calls and sessions.

Handling of service prioritization i.e. the study shall determine whether the UE behaviour upon reception of paging information is driven by USIM configuration or user preferences or both.

NOTE 1: This objective is expected to be further aligned through Stage 1 requirements. Additional objectives may be added if there are further Stage 1 requirements.

NOTE 2: The enablers for Dual-USIM are expected to also apply to multi-USIM scenarios.

The study shall be restricted to single Rx/single Tx and dual Rx/single Tx UE implementations.

NOTE 3: The focus of the study is on enablers for multi-USIM implementations relying on common radio and baseband components that are shared among the multiple USIMs.

The problem statement being common to 5GS and EPS, it is expected that the study conclusions will apply to both 5GS and EPS, but the solutions for 5GS and EPS need not be the same.

The system enablers for multi-USIM devices are expected to apply for the cases where the multiple USIMs are owned by the same or by different MNOs.

While the solutions developed as part of this study may also be applicable to DR-mode (single USIM) interworking between 5GS and EPS, 5GS-EPS interworking use cases with DR-mode (single USIM) are considered outside the scope of this study.

Figure 5:
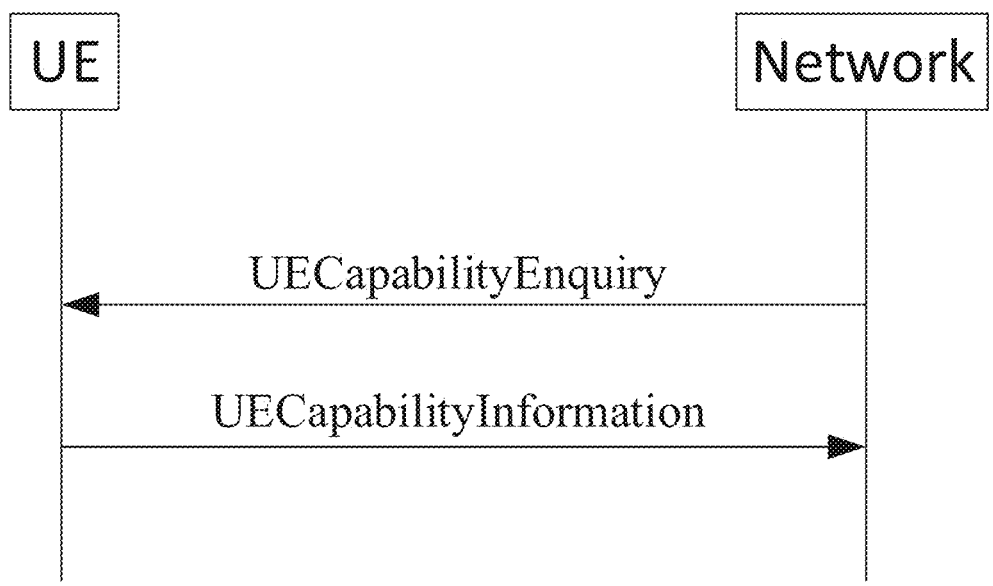
FIG. 5 is a diagram illustrating an exemplary scenario associated with UE capability transfer according to one exemplary embodiment.

The procedure of UE capability transfer is specified in 3GPP TS 38.331 V15.4.0. Notably, FIG. 5.6.1.1-1 of Section 5.6.1.1 of 3GPP TS 38.331 V15.4.0, entitled "UE capability transfer", is reproduced herein as FIG. 5. Parts of 3GPP TS 38.331 V15.4.0 are quoted below:

5.6.1 UE Capability Transfer 5.6.1.1 General

This clause describes how the UE compiles and transfers its UE capability information upon receiving a UECapabilityEnquiry from the network.

5.6.1.2 Initiation

The network initiates the procedure to a UE in RRC_CONNECTED when it needs (additional) UE radio access capability information.

5.6.1.3 Reception of the UECapabilityEnquiry by the UE

The UE shall set the contents of UECapabilityInformation message as follows:

1>if the ue-Capabili RAT-RequestList contains a UE-Capabili RAT-Request with rat-Type set to nr:
  2>include in the ue-Capabili RAT-ContainerList a UE-Capabili RAT-Container of the type UE-NR-Capability and with the rat-Type set to nr;
  2>include the supportedBandCombinationList, featureSets and featureSetCombinations as specified in clause 5.6.1.4;

1>if the ue-Capabili RAT-RequestList contains a UE-Capabili RAT-Request with rat-Type set to eutra-nr:
  2>if the UE supports EN-DC:
    3>include in the ue-Capabili RAT-ContainerList a UE-Capabili RAT-Container of the type UE-MRDC-Capability and with the rat-Type set to eutra-nr;
    3>include the supportedBandCombinationList and featureSetCombinations as specified in clause 5.6.1.4;

1>if the ue-Capabili RAT-RequestList contains a UE-Capabili RAT-Request with rat-Type set to eutra:
  2>if the UE supports E-UTRA:
    3>include in the ue-Capabili RAT-ContainerList a ue-Capabili RAT-Container of the type UE-EU- TRA-Capability and with the rat-Type set to eutra as specified in TS 36.331 [10], clause 5.6.3.3;
1>submit the UECapabilityInformation message to lower layers for transmission, upon which the procedure ends.

In some embodiments, a Universal Integrated Circuit Card (UICC) is a physically secure device, an Integrated Circuit (IC) card and/or a smart card. In some embodiments, the UICC can be inserted and removed from a terminal, such as a mobile terminal (e.g., a mobile device and/or a mobile phone). In some embodiments, the UICC may comprise one or more applications. An application of the one or more applications may be a universal subscriber identity module (USIM). In some embodiments, the USIM is an application residing on the UICC used for accessing services provided by one or more mobile networks. In some embodiments, the application may be able and/or configured to register on the one or more mobile networks (e.g., via appropriate security).

Specifications associated with exemplary UICCs and/or USIMs are described in 3GPP TS 21.905 V15.1.0.

Requirements associated with exemplary UICCs and/or USIMs are specified in 3GPP TS 21.211 V15.1.1. Some of the requirements specified in 3GPP TS 21.211 V15.1.1 are listed below (more details regarding the requirements can be found in 3GPP TS 21.211 V15.1.1):

The UICC shall be either a removable hardware module or a non-removable separate hardware module embedded in the ME. The USIM on a UICC shall contain an identity which unambiguously identifies a subscriber.

The USIM shall provide storage for subscription and subscriber related information.

The functions of the USIM include authenticating itself to the network and vice versa, authenticating the user and providing additional security functions as defined in 3GPP TS 33.102.

The USIM shall be unambiguously identified.

A means shall be specified to mutually authenticate the USIM and the network by showing knowledge of a secret key K which is shared between and available only to the USIM and in the user's Home Environment.

The USIM shall contain information elements for 3G network operations. The USIM may contain information elements related to the subscriber, 3G services and home environment or service provider related information.

Descriptions with regard to UICCs and/or USIMs in 3GPP TS 21.211 V15.1.1 should be applied to 3GPP 3G, 4G and/or 5G networks. Although some description is provided in view of 3G networks and/or 3G services, such description should be applied to 4G and/or 5G networks and/or services as well.

It may be appreciated that the term "USIM" as used herein is used generally and may refer to a SIM, a USIM and/or a UICC with a USIM.

Figure 6:
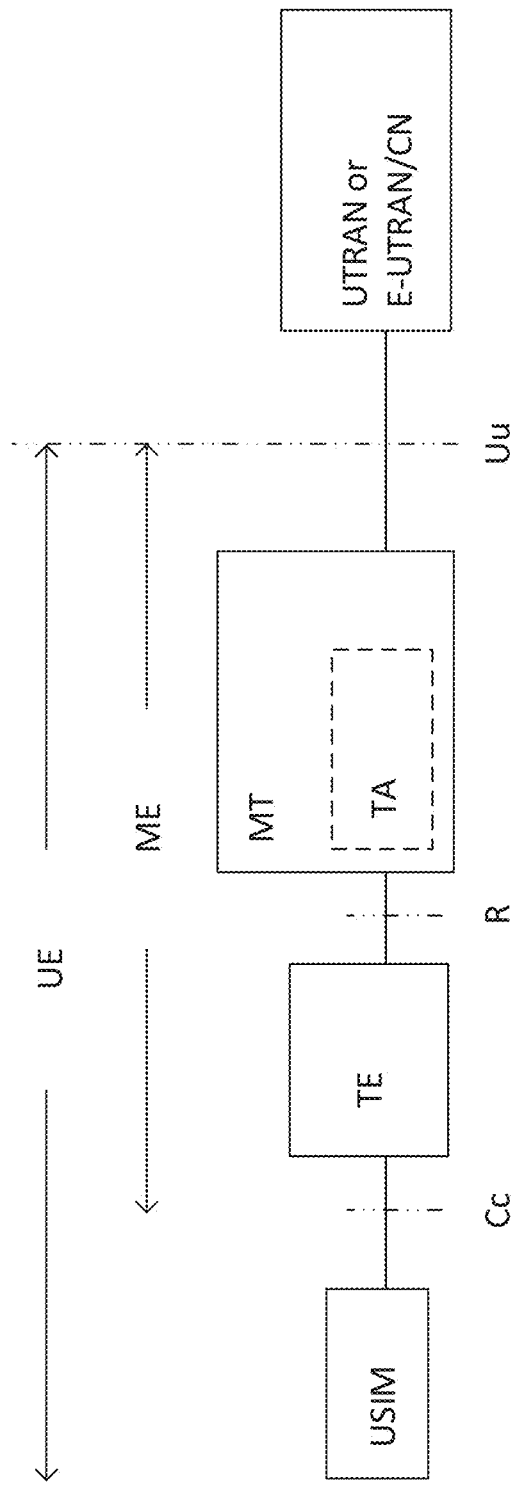
FIG. 6 is a diagram illustrating an exemplary UE according to one exemplary embodiment.

FIG. 2 of 3GPP TS 24.002 V15.0.0, entitled "PLMN Access Reference Configuration (UTRAN Iu mode or E-UTRAN)", is reproduced herein as FIG. 6. FIG. 6 illustrates one or more components of an exemplary UE. In some embodiments, the exemplary UE may comprise a USIM and/or a mobile equipment (ME). In some embodiments, the ME comprises a Terminal Equipment (TE) and/or a Mobile Termination (MT) comprising a Terminal Adaptor (TA). In some embodiments, the ME may provide for radio transmission, channel management and/or functions for operations of access protocols. In some embodiments, the ME may communicate with a network via Uu interface. In some embodiments, the network comprises a Universal Mobile Telecommunications System (UMTS) Radio Access Network (UTRAN). In some embodiments, the network comprises an Evolved-UTRAN (E-UTRAN) and/or a Core Network (CN).

In some embodiments, a multi-USIM device (e.g., a multi-USIM UE) is equipped with multiple USIM cards sharing common radio and baseband components. It may be appreciated that the term "USIM card" as used herein may correspond to a card (e.g., a UICC) with a USIM. In some embodiments the multiple USIM cards comprise two USIM cards and/or more than two USIM cards. In some embodiments, the multi-USIM device may be implemented with a single receiver and/or a single transmitter. Alternatively and/or additionally, the multi-USIM device may be implemented with a dual receiver and/or a single transmitter. In some embodiments, the multi-USIM device may be associated with dual USIM single standby (and/or dual SIM single standby). Alternatively and/or additionally, the multi-USIM device may be associated with dual USIM dual standby (and/or dual SIM dual standby), where the multiple USIM cards may be accessed, such as via time multiplexing. Alternatively and/or additionally, the multi-USIM device may be associated with dual USIM dual active (and/or dual SIM dual active (DSDA)), such as where the multi-USIM device comprises multiple transceivers associated with the multiple USIM cards.

In some embodiments, the multi-USIM device is equipped with two USIM cards. It may be appreciated that the multi-USIM device may be equipped with more than two USIM cards. However, some exemplary scenarios of the present disclosure are described with respect to a device having two USIM cards for purposes of simplicity and/or understandability of the scenarios. It may be appreciated that one skilled in the art may understand and/or use such exemplary scenarios for application in devices equipped with more than two USIM cards while remaining within the scope of the present disclosure. Accordingly, the present disclosure is not limited to scenarios in which a device has merely two USIM cards, and can be applied to devices having more than two USIM cards.

Figure 7:
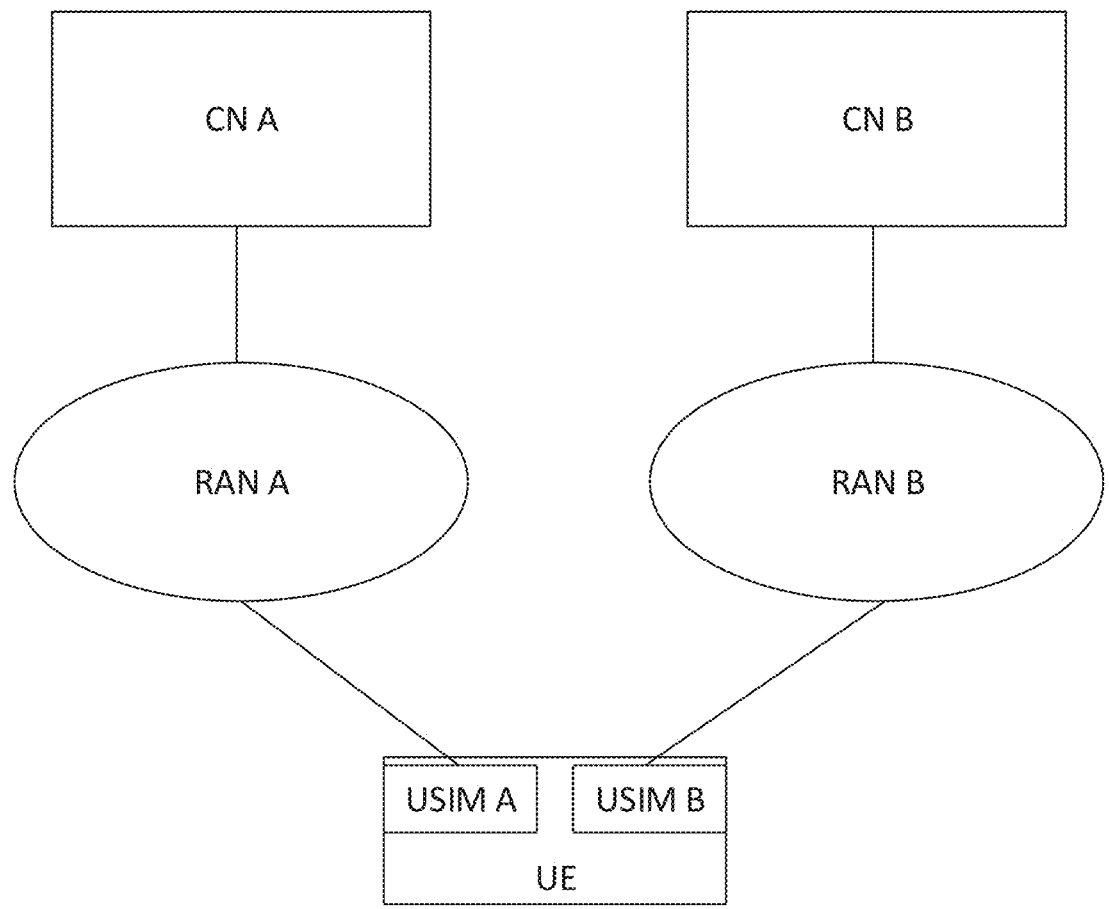
FIG. 7 is a diagram illustrating an exemplary multi-Universal Subscriber Identity Module (USIM) device according to one exemplary embodiment.

In some embodiments, the multi-USIM device is equipped with two USIM cards (and/or more than two USIM cards). In some embodiments, the multi-USIM device is equipped with USIM A and USIM B. In some embodiments, the USIM A is associated with a system called system A, a CN called CN A, a radio access network (RAN) called RAN A, a cell called cell A, a Mobile Network Operator (MNO) called MNO A and/or a Public Land Mobile Network (PLMN) called PLMN A. In some embodiments, the USIM B is associated with a system called system B, a CN called CN B, a RAN called RAN B, a cell called cell B, a MNO called MNO B and/or a PLMN called PLMN B. FIG. 7 illustrates an exemplary embodiment of the multi-USIM device, where the multi-USIM device is a UE equipped with the USIM A and the USIM B. In some embodiments, the UE is connected to the RAN A and/or the CN A associated with the USIM A. In some embodiments, the UE is connected to the RAN B and/or the CN B associated with the USIM B.

One of the challenges for the multi-USIM device is that the multi-USIM device may not be able to communicate with multiple 3GPP systems associated with multiple USIMs of the multi-USIM device concurrently and/or simultaneously. In some embodiments, a 3GPP system may comprise at least one of a CN, a RAN, a cell, etc. In some embodiments, the multi-USIM device may not be able to communicate with the system A and the system B concurrently and/or simultaneously. For example, during a period of time when the multi-USIM device is communicating with the system A (associated with the USIM A), the multi-USIM device may not be able to communicate with the system B (associated with the USIM B). In some embodiments, the communication (of the multi-USIM device with the system A) may include merely uplink transmission, merely downlink reception, and/or both uplink transmission and downlink reception. In some embodiments, if there is a need for the multi-USIM device to communicate with the system A (e.g., a need to at least one of monitor paging, to perform one or more measurements, to acquire system information, to establish a connection, to transmit data, to receive data, etc.), the multi-USIM device may be required to interrupt one or more ongoing communications and/or connections with the system B. In some embodiments, such an interruption in the one or more ongoing communications and/or connections device may cause the multi-USIM device to disappear to the system B, similar to a situation where the multi-USIM device is shielded and/or encounters radio problems. In some embodiments, if the interruption lasts too long and/or exceeds a threshold duration of time, the connection of the multi-USIM device with the system B may be dropped, such as by the system B and/or a network associated with the system B. Accordingly, the interruption and/or the connection being dropped may cause performance degradation, such as inefficient communication between the multi-USIM device and the system B. Such a situation may be difficult for the network to handle since the network is not aware of the cause of the interruption. For example, the network may not be able to determine whether the interruption is caused by radio problems or the multi-USIM device communicating with another system.

In order to solve the issue, a device could provide information related to multi-USIM to a network node associated with a system. The system may determine, based on the information, that the device is a multi-USIM device. The information may correspond to a request that the network node and/or the system deal with one or more multi-USIM problems, such as interruptions in on-going communications and/or connections with the network node and/or the system. The information may indicate that one or more multi-USIM problems, such as the interruptions, do not need to be handled (by the network node and/or the system). The information may enable the system to deal with (and/or stop dealing with) the interruptions associated with the device. The information being provided to the system may enable the system to provide a corresponding configuration to the device for configuring and/or de-configuring one or more multi-USIM related configurations associated with the device. The information being provided to the system may enable the system to decide whether to suspend, release and/or resume the device. Alternatively and/or additionally, the information being provided to the system may enable the system to determine whether it is required and/or needed to suspend, release and/or resume the device. The information being provided to the system may enable the system to initiate negotiation (and/or handshaking) with another system (e.g., a different system associated with another USIM of the device).

In some embodiments, the information may be indicative of a capability and/or a status associated with the device, such as a capability and/or a status related to multi-USIM.

In some embodiments, the information may indicate that the device is a multi-USIM device.

Alternatively and/or additionally, the information may indicate a number of USIMs supported by the device.

Alternatively and/or additionally, the information may be indicative of whether multiple USIMs associated with the device share a single transmitter.

Alternatively and/or additionally, the information may be indicative of whether the multiple USIMs associated with the device share a single receiver.

Alternatively and/or additionally, the information may be indicative of whether the multiple USIMs associated with the device can be in standby concurrently and/or simultaneously (e.g., whether the multiple USIMs can be used for idle-mode network connection concurrently and/or simultaneously).

Alternatively and/or additionally, the information may be indicative of whether the multiple USIMs associated with the device can be in standby in one or more types of networks concurrently and/or simultaneously (e.g., whether the multiple USIMs can be used for idle-mode network connection associated with the one or more types of networks concurrently and/or simultaneously). The one or more types of networks may comprise 4G, 5G, Evolved Packet Core (EPC), 5G Core (5GC), Evolved Packet System (EPS), 5G System (5GS), LTE or NR and/or a combination of one or more of 4G, 5G, EPC, 5GC, EPS, 5GS, LTE or NR.

Alternatively and/or additionally, the information may be indicative of whether the multiple USIMs associated with the device can be active concurrently and/or simultaneously (e.g., whether the multiple USIMs can be used for connected-mode network connection concurrently and/or simultaneously).

Alternatively and/or additionally, the information may be indicative of whether the multiple USIMs associated with the device can be active in one or more types of networks concurrently and/or simultaneously (e.g., whether the multiple USIMs can be used for connected-mode network connection associated with the one or more types of networks concurrently and/or simultaneously). The one or more types of networks may comprise 4G, 5G, EPC, 5GC, EPS, 5GS, LTE or NR and/or a combination of one or more of 4G, 5G, EPC, 5GC, EPS, 5GS, LTE or NR.

Alternatively and/or additionally, the information may be indicative of whether first communication performed by the device using a first USIM of the device may be interrupted by second communication performed by the device using a second USIM of the device. In some embodiments, the first communication and/or the second communication may comprise monitoring paging, performing measurements, acquiring system information, establishing one or more connections, transmitting data and/or receiving data.

Alternatively and/or additionally, the information may be indicative of whether a multi-USIM problem, such as an interruption and/or a potential interruption in communication between the system and the device, needs to be handled and/or should be handled, such as by the device and/or by the system. The information may indicate that a multi-USIM problem needs to be handled. The information may indicate that a multi-USIM problem does not need to be handled.

Alternatively and/or additionally, the information may be indicative of one or more indications and/or one or more instructions corresponding to one or more operations that the system and/or the device may perform to solve the multi-USIM problem.

Alternatively and/or additionally, the information may correspond to a request for a multi-USIM solution from (and/or by) the system.

Alternatively and/or additionally, the information may be indicative of whether the device prefers a multi-USIM solution from (and/or by) the system.

Alternatively and/or additionally, the information may be indicative of whether a procedure related to multi-USIM should be performed and/or whether the procedure needs to be performed. In some embodiments, the procedure may correspond to the device reporting data associated with multi-USIM to the system.

Alternatively and/or additionally, the information may be indicative of whether a configuration associated with multi-USIM (e.g., a multi-USIM specific configuration) should be provided and/or whether the configuration is needed.

Alternatively and/or additionally, the information may be indicative of whether the device is operating in single-USIM mode or multi-USIM mode.

Alternatively and/or additionally, the information may be indicative of a number of active USIMs in the device, such as a number of USIMs in the device that can be used for connected-mode network connection concurrently and/or simultaneously.

Alternatively and/or additionally, the information may be indicative of a number of standby USIMs in the device, such as a number of USIMs in the device that can be used for idle-mode network connection concurrently and/or simultaneously.

Alternatively and/or additionally, the information may be indicative of whether the multiple USIMs of the device are associated with and/or belong to a single MNO (and/or a single PLMN).

Alternatively and/or additionally, the information may be indicative of a MNO (and/or a PLMN) associated with one or more USIMs of the device. In some embodiments, the system (that the information may be transmitted to) is associated with a USIM that is different than the one or more USIMs (e.g., the information indicates a MNO associated with USIM A and the information is transmitted to the system associated with USIM B).

Alternatively and/or additionally, the information may be indicative of one or more types of networks of one or more networks that the device is registered with, attached to and/or connected to. In some embodiments, the one or more networks are associated with one or more USIMs of the device. In some embodiments, the system (that the information may be transmitted to) is associated with a USIM different than the one or more USIMs (e.g., the information indicates a network type associated with USIM A and the information is transmitted to the system associated with USIM B). In some embodiments, the one or more types of networks may comprise 4G, 5G, EPC, 5GC, EPS, 5GS, LTE or NR and/or a combination of one or more of 4G, 5G, EPC, 5GC, EPS, 5GS, LTE or NR.

Alternatively and/or additionally, the information may identify a network node in a network associated with one or more USIMs of the device. In some embodiments, the system (that the information may be transmitted to) is associated with a USIM different than the one or more USIMs (e.g., the information indicates a network node associated with USIM A and the information is transmitted to the system associated with USIM B). In some embodiments, the network node may be a serving network node associated with the device. In some embodiments, the network node may be used to manage the device (and/or to schedule communications with the device). In some embodiments, the network node may be a CN node. In some embodiments, the network node may be a RAN node. In some embodiments, the information may comprise an identity of the network node and/or an identifier that identifies the network node, such as at least one of a cell global identifier (CGI), a gNB identifier, a global gNB identifier, etc.

Alternatively and/or additionally, the information may be indicative of one or more serving cells in a network associated with one or more USIMs of the device. In some embodiments, the system (that the information may be transmitted to) is associated with a USIM different than the one or more USIMs (e.g., the information indicates a serving cell associated with USIM A and the information is transmitted to the system associated with USIM B).

Alternatively and/or additionally, the information may be indicative of an identity of the device used in a network associated with one or more USIMs of the device (e.g., the identity of the device may be used for performing communications between the device and the network). In some embodiments, the system (that the information may be transmitted to) is associated with a USIM different than the one or more USIMs (e.g., the information indicates an identity associated with USIM A and the information is transmitted to the system associated with USIM B). In some embodiments, the identity may comprise a Cell Radio Network Temporary Identifier (C-RNTI), an International Mobile Subscriber Identity (IMSI), a Temporary Mobile Subscriber Identity (TMSI) (e.g., a Packet-TMSI (P-TMSI), a Serving-TMSI (S-TMSI) and/or a 5G-TMSI), a Subscription Permanent Identifier (SUPI), a Subscription Concealed Identifier (SUCI) and/or a Globally Unique Temporary UE Identity (GUTI) (e.g., a 5G-GUTI).

Alternatively and/or additionally, the information may be indicative of whether a network associated with one or more USIMs of the device supports one or more multi-USIM features, such as whether the network supports communication with a multi-USIM device and/or whether the network can communicate with a multi-USIM device in accordance with the one or more multi-USIM features. In some embodiments, the system (that the information may be transmitted to) is associated with a USIM different than the one or more USIMs.

In some embodiments, a multi-USIM problem may be a problem that occurs (and/or that may potentially occur) due to the multiple USIMs in the device (e.g., the UE) and/or due to the device using the multiple USIMs. For example, the multi-USIM problem may comprise a service interruption for a USIM A of the device while the device is communicating via a USIM B of the device. Alternatively and/or additionally, the multi-USIM problem may comprise a paging reception collision between a reception associated with the USIM A and a reception associated with the USIM B. A multi-USIM solution may be a solution to solve, mitigate and/or eliminate the multi-USIM problem.

In some embodiments, the USIM A may be associated with a network A and/or the USIM B may be associated with a network B. In some embodiments, the device may provide information, corresponding to USIM A, to the network A and/or the network B. In some embodiments, the device may provide the information to the network B. In some embodiments, the information (corresponding to USIM A) may not be provided to the network A. In some embodiments, the information may be provided to merely one of the network A or the network B. In a first example, the information may be provided to the network A and not to the network B. In a second example, the information may be provided to the network B and not to the network A. In some embodiments, the information may be provided to merely one of the network A or the network B if the network A and the network B are associated with (and/or belong to) a single MNO (and/or a single PLMN). In some embodiments, the information may be provided to the network A and the network B. In some embodiments, the information may be provided to the network A and the network B if the network A is associated with (and/or belongs to) a first MNO (and/or a first PLMN) and/or the network B is associated with (and/or belongs to) a second MNO (and/or a second PLMN), where the first MNO (and/or the first PLMN) is different than the second MNO (and/or the second PLMN).

In some embodiments, the information may be provided to a network (such as the network A and/or the network B) if one or more conditions are met (and/or fulfilled). In some embodiments, the network is associated with USIM A and/or USIM B.

In some embodiments, the one or more conditions may comprise a first condition that the device is registered with (and/or attached to) the network.

Alternatively and/or additionally, the one or more conditions may comprise a second condition that the network enquires for the information. In some embodiments, the network may make the enquiry via a procedure associated with UE capability transfer. In some embodiments, the network may indicate, in a request message such as a UE capability enquiry message, whether the network supports one or more multi-USIM functionalities. In some embodiments, the network may indicate, in a request message such as a UE capability enquiry message, a type of information that is enquired for and/or requested by the network.

Alternatively and/or additionally, the one or more conditions may comprise a third condition that an operation mode of the device changes. In some embodiments, a change in the operation mode of the device corresponds to a change from single-USIM mode to multi-USIM mode. In some embodiments, a change in the operation mode of the device corresponds to a change from multi-USIM mode to single-USIM mode.

Alternatively and/or additionally, the one or more conditions may comprise a fourth condition that a number of active USIMs of the device changes. In some embodiments, a change in the number of active USIMs may occur when a state of a USIM of the device changes from active to non-active. In some embodiments, a change in the number of active USIMs may occur when a state of a USIM of the device changes from non-active to active. In some embodiments, a change in the number of active USIMs may occur when a USIM (e.g., an active USIM) is removed from the device. In some embodiments, a change in the number of active USIMs may occur when a USIM (e.g., an active USIM) is inserted into the device. In some embodiments, a change in the number of active USIMs may occur when a USIM (e.g., an active USIM) of the device is disabled. In some embodiments, a change in the number of active USIMs may occur when a USIM (e.g., an active USIM) of the device is enabled.

Alternatively and/or additionally, the one or more conditions may comprise a fifth condition that a number of standby USIMs of the device changes. In some embodiments, a change in the number of standby USIMs may occur when a state of a USIM of the device changes from standby to non-standby. In some embodiments, a change in the number of standby USIMs may occur when a state of a USIM of the device changes from non-standby to standby. In some embodiments, a change in the number of standby USIMs may occur when a USIM (e.g., a standby USIM) is removed from the device. In some embodiments, a change in the number of standby USIMs may occur when a USIM (e.g., a standby USIM) is inserted into the device. In some embodiments, a change in the number of standby USIMs may occur when a USIM (e.g., a standby USIM) of the device is disabled. In some embodiments, a change in the number of standby USIMs may occur when a USIM (e.g., a standby USIM) of the device is enabled.

Alternatively and/or additionally, the one or more conditions may comprise a sixth condition that a number of enabled USIMs of the device changes. In some embodiments, a change in the number of enabled USIMs may occur when a USIM of the device is enabled or disabled.

Alternatively and/or additionally, the one or more conditions may comprise a seventh condition that a status associated with the device, such as a status related to multi-USIM, changes and/or is different than a status previously (and/or most recently) reported to the network.

Alternatively and/or additionally, the one or more conditions may comprise an eighth condition that a capability associated with the device, such as a capability related to multi-USIM, changes and/or is different than a capability previously (and/or most recently) reported to the network.

Alternatively and/or additionally, the one or more conditions may comprise a ninth condition that a serving MNO of the device (e.g., an MNO that serves the device) changes from a first MNO to a second MNO different than the first MNO (e.g., the device may change and/or switch from being served by the first MNO to being served by the second MNO). In some embodiments, the first MNO and/or the second MNO may be associated with the USIM A and/or the USIM B.

Alternatively and/or additionally, the one or more conditions may comprise a tenth condition that a serving PLMN of the device (e.g., a PLMN that serves the device) changes from a first PLMN to a second PLMN different than the first PLMN (e.g., the device may change and/or switch from being served by the first PLMN to being served by the second PLMN). In some embodiments, the first PLMN and/or the second PLMN may be associated with the USIM A and/or the USIM B.

Alternatively and/or additionally, the one or more conditions may comprise an eleventh condition that a serving RAT of the device (e.g., a RAT that serves the device) changes from a first RAT to a second RAT different than the first RAT (e.g., the device may change and/or switch from being served by the first RAT to being served by the second RAT). In some embodiments, the first RAT and/or the second RAT may be associated with a second network, such as the network and/or a different network, associated with the USIM A and/or the USIM B.

Alternatively and/or additionally, the one or more conditions may comprise a twelfth condition that a connection is resumed. In some embodiments, the connection may correspond to a connection of the device with a second network, such as the network and/or a different network, associated with the USIM A and/or the USIM B.

Alternatively and/or additionally, the one or more conditions may comprise a thirteenth condition that an interruption is eliminated and/or ends (and/or that a likelihood decreases that an interruption interrupting communication between the device and the network occurs). In some embodiments, the interruption may be due to communication with a different network than the network, where the different network is associated with one or more USIMs different than one or more USIMs associated with the network. In some embodiments, the interruption may be eliminated and/or may end (and/or the likelihood of the interruption may decrease) when a connection is dropped, such as when a connection of the device with the different network is dropped. In some embodiments, the interruption may be eliminated and/or may end (and/or the likelihood of the interruption may decrease) when a radio link failure associated with the different network occurs. In some embodiments, the interruption may be eliminated and/or may end (and/or the likelihood of the interruption may decrease) when the different network is out-of-coverage (and/or changes from in-coverage to out-of-coverage). In some embodiments, the interruption may be eliminated and/or may end when signal associated with the different network is lost by the device.

Alternatively and/or additionally, the one or more conditions may comprise a fourteenth condition that an interruption, due to communication with a different network than the network, becomes possible (and/or that a likelihood increases that an interruption interrupting communication between the device and the network occurs). In some embodiments, the different network is associated with one or more USIMs different than one or more USIMs associated with the network. In some embodiments, the interruption may become possible (and/or the likelihood of the interruption may increase) when a connection is established and/or reestablished, such as when a connection of the device with the different network is established and/or reestablished. In some embodiments, the interruption may become possible (and/or the likelihood of the interruption may increase) when a radio link failure associated with the different network recovers. In some embodiments, the interruption may become possible (and/or the likelihood of the interruption may increase) when the different network is in-coverage (and/or changes from out-of-coverage to in-coverage). In some embodiments, the interruption may become possible (and/or the likelihood of the interruption may increase) when signal associated with the different network is not lost by the device (and/or when signal associated with the different network changes from being lost to not being lost and/or when a lost signal associated with the different network is recovered).

Alternatively and/or additionally, the one or more conditions may comprise a fifteenth condition that the device obtains an identity to be used in a second network, such as the network and/or a different network, associated with a USIM of the device. In some embodiments, the identity may be different than a second identity of the device used in a third network different than the second network, where the second identity may have been obtained prior to obtaining the identity.

Alternatively and/or additionally, the one or more conditions may comprise a sixteenth condition that one or more needs and/or one or more preferences of the device change. In some embodiments, the one or more needs and/or the one or more preferences may be indicative of whether the device has a need and/or a preference that a multi-USIM problem be handled.

In some embodiments, the information may be provided (e.g., transmitted) to the network if one or more first conditions are met (and/or fulfilled). In some embodiments, the one or more first conditions comprise one or more of the first condition, the second condition, the third condition, the fourth condition, the fifth condition, the sixth condition, the seventh condition, the eighth condition, the ninth condition, the tenth condition, the eleventh condition, the twelfth condition, the thirteenth condition, the fourteenth condition, the fifteenth condition and/or the sixteenth condition. In some embodiments, the information may be provided to the network responsive to the one or more first conditions being met. In some embodiments, the information may be provided to the network responsive to a determination that the one or more first conditions are met.

In some embodiments, the information may be provided to the network in one or more occasions. In some embodiments, the one or more occasions may correspond to one or more times when one or more second conditions are met and/or become fulfilled (e.g., an occasion of the one or more occasions may correspond to a time when a condition of the one or more second conditions is met or becomes fulfilled). In some embodiments, the one or more second conditions comprise one or more of the first condition, the second condition, the third condition, the fourth condition, the fifth condition, the sixth condition, the seventh condition, the eighth condition, the ninth condition, the tenth condition, the eleventh condition, the twelfth condition, the thirteenth condition, the fourteenth condition, the fifteenth condition and/or the sixteenth condition.

In some embodiments, the information may be provided to the network responsive to one or more events. In some embodiments, the one or more events may comprise one or more third conditions being met (e.g., an event of the one or more events may comprise a condition of the one or more third conditions being met). In some embodiments, the one or more third conditions comprise one or more of the first condition, the second condition, the third condition, the fourth condition, the fifth condition, the sixth condition, the seventh condition, the eighth condition, the ninth condition, the tenth condition, the eleventh condition, the twelfth condition, the thirteenth condition, the fourteenth condition, the fifteenth condition and/or the sixteenth condition. In some embodiments, the information may be provided to the network responsive to one, some and/or all of the one or more events. In some embodiments, the information may be provided to the network responsive to a determination that one, some and/or all of the one or more events occurred.

In some embodiments, the information may not be provided to the network if one or more fourth conditions are met (and/or fulfilled). In some embodiments, the network is associated with USIM A and/or USIM B.

In some embodiments, the one or more fourth conditions may comprise a seventeenth condition that the device is registered with (and/or attached) to the network.

Alternatively and/or additionally, the one or more fourth conditions may comprise an eighteenth condition that the device establishes a connection (e.g., a Radio Resource Control (RRC) connection) to the network.

Alternatively and/or additionally, the one or more fourth conditions may comprise a nineteenth condition that the device releases a connection (e.g., a RRC connection) to the network.

Alternatively and/or additionally, the one or more fourth conditions may comprise a twentieth condition that a status associated with the device, such as a status related to multi-USIM, has not changed and/or is not different than a status previously (and/or most recently) reported to the network.

Alternatively and/or additionally, the one or more fourth conditions may comprise a twenty-first condition that a capability associated with the device, such as a capability related to multi-USIM, has not changed and/or is not different than a status previously (and/or most recently) reported to the network.

Alternatively and/or additionally, the one or more fourth conditions may comprise a twenty-second condition that a serving cell of the device changes from a first cell to a second cell different than the first cell (e.g., the device may change and/or switch from being served by the first cell to being served by the second cell). In some embodiments, the first cell and/or the second cell may be associated with the network associated with the USIM A and/or the USIM B and/or a different network associated with the USIM A and/or the USIM B.

Alternatively and/or additionally, the one or more fourth conditions may comprise a twenty-third condition that a serving RAT of the device changes from a first RAT to a second RAT different than the first RAT (e.g., the device may change and/or switch from being served by the first RAT to being served by the second RAT). In some embodiments, the first RAT and/or the second RAT may be associated with the network associated with the USIM A and/or the USIM B and/or a different network associated with the USIM A and/or the USIM B.

Alternatively and/or additionally, the one or more fourth conditions may comprise a twenty-fourth condition that one or more needs and/or one or more preferences of the device change. In some embodiments, the one or more needs and/or the one or more preferences may be indicative of whether the device has a need and/or a preference that a multi-USIM problem be handled.

In some embodiments, the information may not be provided to the network if one or more fifth conditions are met (and/or fulfilled). In some embodiments, the one or more fifth conditions comprise one or more of the seventeenth condition, the eighteenth condition, the nineteenth condition, the twentieth condition, the twenty-first condition, the twenty-second condition, the twenty-third condition and/or the twenty-fourth condition. In some embodiments, the information may not be provided to the network responsive to the one or more fifth conditions being met. In some embodiments, the information may not be provided to the network responsive to a determination that the one or more fifth conditions are met.

In some embodiments, the information may not be provided to the network in one or more occasions. In some embodiments, the one or more occasions may correspond to one or more times when one or more sixth conditions are met and/or become fulfilled (e.g., an occasion of the one or more occasions may correspond to a time when a condition of the one or more sixth conditions is met or becomes fulfilled). In some embodiments, the one or more sixth conditions comprise one or more of the seventeenth condition, the eighteenth condition, the nineteenth condition, the twentieth condition, the twenty-first condition, the twenty-second condition, the twenty-third condition and/or the twenty-fourth condition.

In some embodiments, the information may not be provided to the network responsive to one or more events. In some embodiments, the one or more events may comprise one or more seventh conditions being met (e.g., an event of the one or more events may comprise a condition of the one or more seventh conditions being met). In some embodiments, the one or more seventh conditions comprise one or more of the seventeenth condition, the eighteenth condition, the nineteenth condition, the twentieth condition, the twenty-first condition, the twenty-second condition, the twenty-third condition and/or the twenty-fourth condition. In some embodiments, the information may not be provided to the network responsive to one, some and/or all of the one or more events. In some embodiments, the information may not be provided to the network responsive to a determination that one, some and/or all of the one or more events occurred.

In some embodiments, the information may be provided to the network by providing the information to a network node of a system (and/or the network).

In some embodiments, the network node may be a CN node (e.g., at least one of Mobility Management Entity (MME), Serving Gateway (S-GW), Packet Data Network (PDN) Gateway (P-GW), User Plane Function (UPF), Access and Mobility Management Function (AMF), etc.). In some embodiments, a CN associated with the CN node may be EPC and/or 5GC.

In some embodiments, the network node may be a RAN node (e.g., at least one of a base station, eNB, gNB, Next Generation eNB (NG-eNB), Distributed Unit (DU), Central Unit (CU), etc.).

In some embodiments, the network node may control a serving cell (e.g., Primary Cell (PCell)) of the device.

In some embodiments, the system and/or the network may be associated with the USIM A. Alternatively and/or additionally, the system and/or the network may be associated with the USIM B.

In some embodiments, one, some and/or all of the foregoing conditions, occasions and/or events may be associated with the USIM A (e.g., one, some and/or all of the foregoing conditions, occasions and/or events may be met and/or determined based on activity performed by the device in association with the USIM A). In some embodiments, the network that the information is provided to (based on one, some and/or all of the foregoing conditions, occasions and/or events) may be the network B associated with the USIM B. In some embodiments, the network that the information is provided to may be the network A associated with the USIM A, rather than the network B. In some embodiments, the information may be provided to both the network A and the network B. Alternatively and/or additionally, the information may be provided to merely the network B (and/or the information may not be provided to the network A). Alternatively and/or additionally, the information may be provided to merely the network A (and/or the information may not be provided to the network B).

In some embodiments, the information may be provided to a network (e.g., the network A, the network B and/or a different network) based on a determination that the network supports multi-USIM management functionality. For example, the information may be provided to the network based upon a determination that the network has indicated that the network supports multi-USIM management functionality. In some embodiments, an indication that the network supports multi-USIM management functionality may be in system information. In some embodiments, support for multi-USIM management functionality may correspond to support for information reporting associated with multi-USIM, negotiation and/or handshaking with a different network in association with multi-USIM, and/or provisioning of one or more configurations for facilitation of one or more multi-USIM features and/or multi-USIM operation.

In some embodiments, "PLMN" as used herein may refer to a Home PLMN (HPLMN) of the device (and/or a PLMN similar and/or equivalent to a HPLMN), a Registered PLMN (RPLMN) of the device (and/or a PLMN similar and/or equivalent to a RPLMN) and/or a different type of PLMN.

In some embodiments, the information may be included in a RRC message. In some embodiments, the information may be provided to the network via the RRC message.

In some embodiments, the information may be included in a Non Access Stratum (NAS) message. In some embodiments, the information may be provided to the network via the NAS message.

In some embodiments, transmission of the information to the network may be initiated by the device. Alternatively and/or additionally, the information may be transmitted to the network in response to a network request (e.g., responsive to receiving a request for the information from the network).

In some embodiments, the device is a UE. In some embodiments, the device is equipped with multiple USIMs. In some embodiments, the device is capable of using multiple USIMs and/or the device supports usage of multiple USIMs.

In some embodiments, the device is in a connected state (e.g., RRC_Connected). Alternatively and/or additionally, the device is in an idle state (e.g., RRC_Idle). Alternatively and/or additionally, the device is in a suspended state (e.g., RRC_Suspended). In some embodiments, the device may be in the connected state (e.g., RRC_Connected), the idle state (e.g., RRC_Idle) and/or the suspended state (e.g., RRC_Suspended) when the device transmits the information to the network.

In some embodiments, a standby USIM may be a USIM, where a state (of the USIM and/or the device) is in standby such that the device may monitor paging, perform one or more measurements and/or stay in an idle state in association with a network corresponding to the USIM.

In some embodiments, an active USIM may be a USIM, where a state (of the USIM and/or the device) is active such that the device may perform data transmission and/or stay in a connected state with a network corresponding to the USIM.

In some embodiments, an enabled USIM may correspond to a USIM that is in standby state and/or in active state.

In some embodiments, a disabled USIM may correspond to a USIM that is not enabled.

Figure 8:
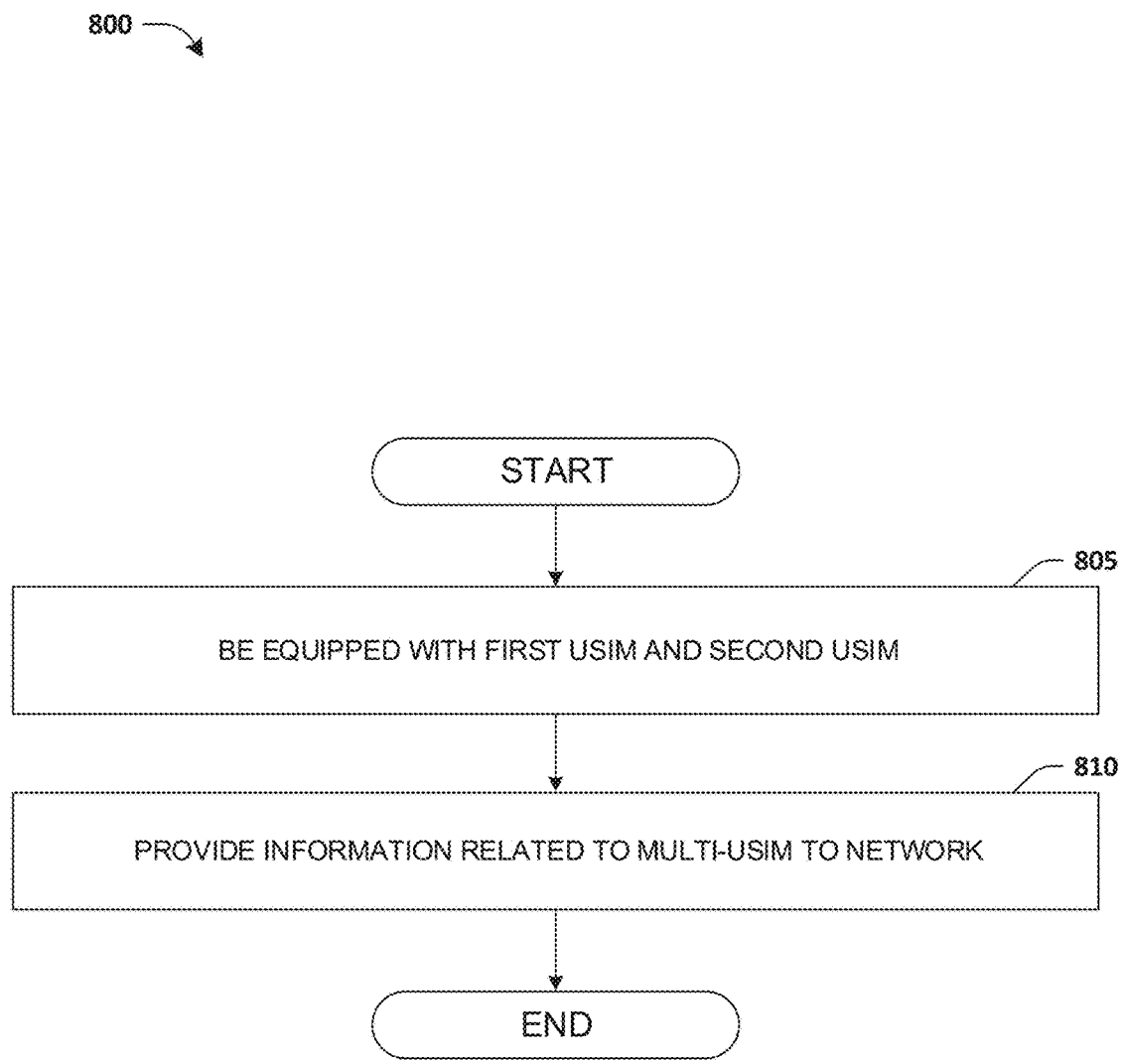
FIG. 8 is a flow chart according to one exemplary embodiment

FIG. 8 is a flow chart 800 according to one exemplary embodiment from the perspective of a UE. In step 805, the UE is equipped with a first USIM and a second USIM. In step 810, the UE provides information related to multi-USIM to a network.

In one embodiment, the information comprises a capability of the UE.

In one embodiment, the information indicates that the UE is a multi-USIM device.

In one embodiment, the information indicates that the first USIM and the second USIM share the same transmitter.

In one embodiment, the information indicates that the first USIM and the second USIM share the same receiver.

In one embodiment, the information indicates that the first USIM and the second USIM can be in standby concurrently and/or simultaneously (e.g., that the first USIM and the second USIM can be in standby states concurrently and/or simultaneously).

In one embodiment, the information indicates that the first USIM and the second USIM can be active concurrently and/or simultaneously (e.g., that the first USIM and the second USIM can be in active states concurrently and/or simultaneously).

In one embodiment, the information indicates that the first USIM and the second USIM can be in standby in one or more types of networks concurrently and/or simultaneously. In some embodiments, the one or more types of networks are 4G, LTE, EPS and/or EPC. Alternatively and/or additionally, the one or more types of networks are 5G, 5GC, 5GS and/or NR.

In one embodiment, the information indicates that the first USIM and the second USIM can be active in one or more types of networks concurrently and/or simultaneously. In some embodiments, the one or more types of networks are 4G, LTE, EPS and/or EPC. Alternatively and/or additionally, the one or more types of networks are 5G, 5GC, 5GS and/or NR.

In one embodiment, the information indicates whether a first communication performed using the first USIM will be interrupted by a second communication using the second USIM. In one embodiment, the first communication comprises paging. In one embodiment, the first communication comprises measurement (e.g., signal measurement). In one embodiment, the first communication comprises system information. In one embodiment, the first communication comprises connection establishment. In one embodiment, the first communication comprises data transmission. In one embodiment, the first communication comprises data reception. In one embodiment, the second communication comprises paging. In one embodiment, the second communication comprises measurement (e.g., signal measurement). In one embodiment, the second communication comprises system information. In one embodiment, the second communication comprises connection establishment. In one embodiment, the second communication comprises data transmission. In one embodiment, the second communication comprises data reception.

In one embodiment, the information indicates whether a second communication performed using the second USIM will be interrupted by a first communication using the first USIM. In one embodiment, the first communication comprises paging. In one embodiment, the first communication comprises measurement (e.g., signal measurement). In one embodiment, the first communication comprises system information. In one embodiment, the first communication comprises connection establishment. In one embodiment, the first communication comprises data transmission. In one embodiment, the first communication comprises data reception. In one embodiment, the second communication comprises paging. In one embodiment, the second communication comprises measurement (e.g., signal measurement). In one embodiment, the second communication comprises system information. In one embodiment, the second communication comprises connection establishment. In one embodiment, the second communication comprises data transmission. In one embodiment, the second communication comprises data reception.

In one embodiment, the information comprises a status of the UE.

In one embodiment, the information indicates whether the UE is operating in single-USIM mode or multi-USIM mode.

In one embodiment, the information indicates a number of active USIMs in the UE.

In one embodiment, the information indicates a number of standby USIMs in the UE.

In one embodiment, the information indicates whether the first USIM and the second USIM are associated with and/or belong to the same MNO and/or the same PLMN.

In one embodiment, the information indicates an MNO and/or a PLMN associated with the first USIM.

In one embodiment, the information indicates an MNO and/or a PLMN associated with the second USIM.

In one embodiment, the information is provided when the UE is registered to (and/or registered with) a second network, such as the network or a different network.

In one embodiment, the information is provided when the UE is attached to a second network, such as the network or a different network.

In one embodiment, the information is provided when enquired by a second network, such as the network or a different network.

In one embodiment, the information is provided when an operation mode of the UE is changed.

In one embodiment, the operation mode corresponds to single-USIM mode and/or multi-USIM mode.

In one embodiment, the information is provided when a number of USIMs (in the UE) is changed.

In one embodiment, the information is provided when the first USIM is enabled.

In one embodiment, the information is provided when the first USIM is disabled.

In one embodiment, the information is provided when the second USIM is enabled.

In one embodiment, the information is provided when the second USIM is disabled.

In one embodiment, the information is provided when a status associated with the UE changes, such as the status changes to a status that is different than a previously reported status, such as a most recently reported status.

In one embodiment, the information is provided when a capability associated with the UE changes, such as the capability changes to a capability that is different than a previously reported capability, such as a most recently reported capability.

In one embodiment, the information is provided when a serving MNO associated with the first USIM is changed (to a different serving MNO), such as when an MNO (associated with the first USIM) that serves the UE is changed and/or switched to a different MNO (associated with the first USIM) that serves the UE.

In one embodiment, the information is provided when a serving MNO associated with the second USIM is changed (to a different serving MNO), such as when an MNO (associated with the second USIM) that serves the UE is changed and/or switched to a different MNO (associated with the second USIM) that serves the UE.

In one embodiment, the information is provided when a serving PLMN associated with the first USIM is changed (to a different serving PLMN), such as when a PLMN (associated with the first USIM) that serves the UE is changed and/or switched to a different PLMN (associated with the first USIM) that serves the UE.

In one embodiment, the information is provided when a serving PLMN associated with the second USIM is changed (to a different serving PLMN), such as when a PLMN (associated with the second USIM) that serves the UE is changed and/or switched to a different PLMN (associated with the second USIM) that serves the UE.

In one embodiment, the information is provided when a serving RAT associated with the first USIM is changed (to a different serving RAT), such as when a RAT (associated with the first USIM) that serves the UE is changed and/or switched to a different RAT (associated with the first USIM) that serves the UE.

In one embodiment, the information is provided when a serving RAT associated with the second USIM is changed (to a different serving RAT), such as when a RAT (associated with the second USIM) that serves the UE is changed and/or switched to a different RAT (associated with the second USIM) that serves the UE.

In one embodiment, the information is provided when a connection associated with the first USIM is resumed.

In one embodiment, the information is provided when a connection associated with the second USIM is resumed.

In one embodiment, the network is associated with the first USIM (e.g., information is provided to the network associated with the first USIM).

In one embodiment, the network is associated with the second USIM (e.g., the information is provided to the network associated with the second USIM).

In one embodiment, the information is included in a RRC message (e.g., the information is provided to the network by transmitting the RRC message to the network).

In one embodiment, the information is included in a NAS message (e.g., the information is provided to the network by transmitting the NAS message to the network).

Referring back to FIGS. 3 and 4, in one exemplary embodiment of a UE, the device 300 includes a program code 312 stored in the memory 310. The CPU 308 could execute program code 312 to enable the UE (i) to be equipped with a first USIM and a second USIM, and (ii) to provide information related to multi-USIM to a network. Furthermore, the CPU 308 can execute the program code 312 to perform one, some and/or all of the above-described actions and steps and/or others described herein.

Figure 9:
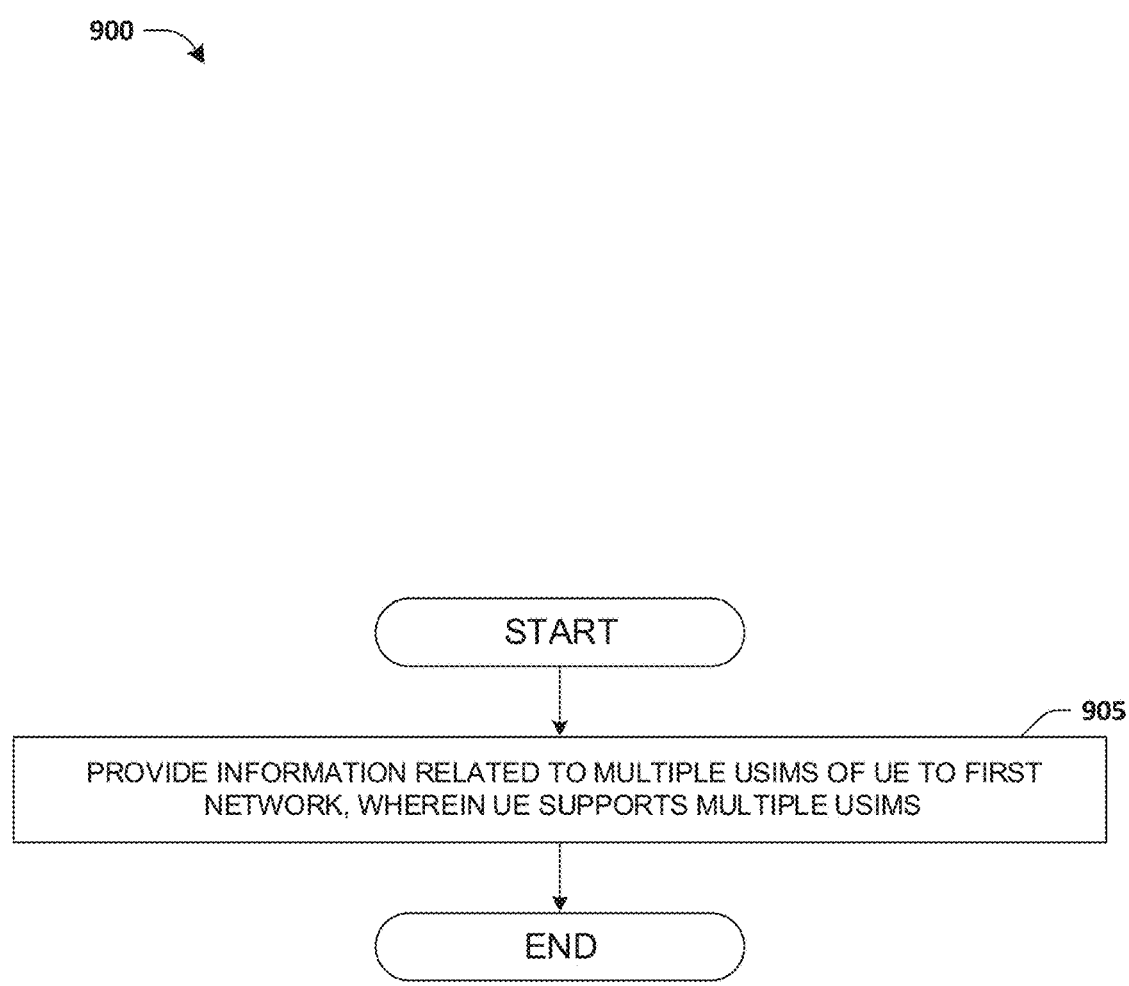
FIG. 9 is a flow chart according to one exemplary embodiment

FIG. 9 is a flow chart 900 according to one exemplary embodiment from the perspective of a UE supporting multiple USIMs (e.g., the UE may support communication with multiple networks associated with multiple USIMs of the UE). In step 905, the UE provides information related to multiple USIMs of the UE to a first network.

In one embodiment, the UE is equipped with a first USIM and a second USIM, wherein the multiple USIMs of the UE comprise the first USIM and the second USIM.

In one embodiment, the information indicates whether the first USIM and the second USIM share a single transmitter. For example, the information may indicate whether the UE performs first communication associated with the first USIM and second communication associated with the second USIM using the single transmitter.

In one embodiment, the information indicates whether the first USIM and the second USIM share a single receiver. For example, the information may indicate whether the UE performs first communication associated with the first USIM and second communication associated with the second USIM using the single receiver.

In one embodiment, the information indicates whether the UE is operating in single-USIM mode or multi-USIM mode.

In one embodiment, the information indicates a number of active USIMs in the UE and/or a number of standby USIMs in the UE.

In one embodiment, the information indicates whether a procedure and/or a configuration related to multi-USIM are required (and/or are needed), such as required and/or needed by the UE.

In one embodiment, the information indicates a type of a second network that the UE is connected to.

In one embodiment, the information is provided to the first network responsive to a determination that the information is different than second information (related to the multiple USIMs) previously and/or most recently reported to the first network (and/or responsive to a determination that the information has changed since the information was last reported to the first network).

In one embodiment, the information is provided to the first network if the information is different than second information (related to the multiple USIMs) previously and/or most recently reported to the first network (and/or if the information has changed since the information was last reported to the first network).

In one embodiment, the information is provided to the first network responsive to a first status associated with the UE changing to a second status that is different than a status (associated with the UE) most recently reported to the first network.

In one embodiment, the information is provided to the first network responsive to a first capability associated with the UE changing to a second capability that is different than a capability (associated with the UE) most recently reported to the first network.

In one embodiment, the information is provided to the first network if a first status associated with the UE changes to a second status that is different than a status (associated with the UE) most recently reported to the first network.

In one embodiment, the information is provided to the first network if a first capability associated with the UE changes to a second capability that is different than a capability (associated with the UE) most recently reported to the first network.

In one embodiment, the information is provided to the first network responsive to an interruption interrupting communication between the UE and the first network due to communication with a second network becoming eliminated. Alternatively and/or additionally, the information is provided to the first network responsive to a likelihood, that an interruption interrupting communication between the device and the first network occurs, decreasing.

In one embodiment, the information is provided to the first network responsive to an interruption interrupting communication between the UE and the first network due to communication with the second network becomes possible. Alternatively and/or additionally, the information is provided to the first network responsive to a likelihood, that an interruption interrupting communication between the device and the first network occurs, increasing.

In one embodiment, the first network and the second network are associated with different USIMs of the multiple USIMs of the UE. For example, the first network is associated with the first USIM of the multiple USIMs and the second network is associated with the second USIM of the multiple USIMs, where the second USIM is different than the first USIM.

Referring back to FIGS. 3 and 4, in one exemplary embodiment of a UE supporting multiple USIMs, the device 300 includes a program code 312 stored in the memory 310. The CPU 308 could execute program code 312 to enable the UE to provide information related to multiple USIMs of the UE to a first network. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 8-9. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise processor-executable instructions, that when executed cause performance of method steps illustrated in one or more of FIGS. 8-9, and/or one, some and/or all of the above-described actions and steps and/or others described herein.

It may be appreciated that applying one or more of the techniques presented herein may result in one or more benefits including, but not limited to, enabling a network and/or a UE to more efficiently deal with problems, such as multi-USIM problems and/or interruptions caused by multi-USIM operation, as a result of enabling the UE to report information related to multi-USIM to the network.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) supporting multiple Universal Subscriber Identity Modules (USIM), the method comprising:
when a first USIM and a second USIM are concurrently active in the UE, indicating, to a first network, that the UE prefers or requests a multi-USIM solution from the first network; and
responsive to a number of active USIMs in the UE changing upon the second USIM in the UE being removed from the UE and the first USIM being the only USIM active in the UE, indicating, to the first network in a registration procedure to the first network, that the UE does not prefer or request the multi-USIM solution after indicating to the first network that the UE prefers or requests the multi-USIM solution.

2. The method of claim 1, wherein:
the UE indicates, to the first network in a second registration procedure to the first network, that the UE prefers or requests the multi-USIM solution from the first network.

3. The method of claim 1, wherein:
the first network is Access and Mobility Management Function (AMF).

4. The method of claim 1, wherein:
the multi-USIM solution is to solve a problem due to the multiple USIMs.

5. The method of claim 4, wherein:
the problem includes a service interruption for the first USIM while the UE is communicating via the second USIM.

6. The method of claim 1, wherein:
the multi-USIM solution includes a mechanism allowing for release of an ongoing connection associated with the first USIM.

7. A communication device supporting multiple Universal Subscriber Identity Modules (USIM), comprising:
a processor; and
memory comprising processor-executable instructions that when executed by the processor cause performance of operations, the operations comprising:
when a first USIM and a second USIM are concurrently active in the communication device, indicating, to a first network, that the communication device prefers or requests a multi-USIM solution from the first network; and
responsive to a number of active USIMs in the communication device changing upon the second USIM in the communication device being removed from the communication device and the first USIM being the only USIM active in the communication device, indicating, to the first network in a registration procedure to the first network, that the communication device does not prefer or request the multi-USIM solution after indicating to the first network that the communication device prefers or requests the multi-USIM solution.

8. The communication device of claim 7, wherein:
the communication device indicates, to the first network in a second registration procedure to the first network, that the communication device prefers or requests the multi-USIM solution from the first network.

9. The communication device of claim 7, wherein:
the first network is Access and Mobility Management Function (AMF).

10. The communication device of claim 7, wherein:
the multi-USIM solution is to solve a problem due to the multiple USIMs.

11. The communication device of claim 10, wherein:
the problem includes a service interruption for the first USIM of the communication device while the communication device is communicating via the second USIM of the communication device.

12. The communication device of claim 7, wherein:
the multi-USIM solution includes a mechanism allowing for release of an ongoing connection associated with the first USIM.

13. A non-transitory computer-readable medium comprising processor-executable instructions that when executed cause performance of operations, comprising:
when a first Universal Subscriber Identity Module (USIM) and a second USIM are concurrently active in a device, indicating, to a first network, that the device prefers or requests a multi-USIM solution from the first network; and
responsive to a number of active USIMs in the device changing upon the second USIM in the device being removed from the device and the first USIM being the only USIM active in the device, indicating, to the first network in a registration procedure to the first network, that the device does not prefer or request the multi-USIM solution after indicating to the first network that the device prefers or requests the multi-USIM solution.

14. A method of a User Equipment (UE) supporting multiple Universal Subscriber Identity Modules (USIM), the method comprising:
when a first USIM and a second USIM are concurrently active in the UE, indicating, to a first network in a registration procedure to the first network, that the UE prefers or requests a multi-USIM solution from the first network, wherein the multi-USIM solution includes a mechanism allowing for release of an ongoing connection associated with the first USIM; and
responsive to a number of active USIMs in the UE changing upon the second USIM in the UE changing from being active to being not active and the first USIM being the only USIM active in the UE, indicating, to the first network in a second registration procedure to the first network, that the UE does not prefer or request the multi-USIM solution after indicating to the first network that the UE prefers or requests the multi-USIM solution.

15. The method of claim 14, wherein:
the second USIM is not active when the second USIM is removed from the UE.

16. The method of claim 14, wherein:
the first network is Access and Mobility Management Function (AMF).

* * * * *